(12) United States Patent
Hankeln et al.

(10) Patent No.: US 10,824,758 B2
(45) Date of Patent: Nov. 3, 2020

(54) SYSTEM AND METHOD FOR MANAGING ENTERPRISE DATA

(71) Applicant: Accenture Global Solutions Limited, Dublin (IE)

(72) Inventors: Wolfgang Hankeln, Dublin (IE); Paul van der Linden, Dublin (IE); Sven Scheuring, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 329 days.

(21) Appl. No.: 15/823,165

(22) Filed: Nov. 27, 2017

(65) Prior Publication Data

US 2019/0163928 A1 May 30, 2019

(51) Int. Cl.
*G06F 21/62* (2013.01)
*G06F 21/31* (2013.01)
*G06F 16/11* (2019.01)
*G06F 16/16* (2019.01)

(52) U.S. Cl.
CPC .......... *G06F 21/6245* (2013.01); *G06F 16/11* (2019.01); *G06F 16/162* (2019.01); *G06F 21/31* (2013.01); *G06F 21/62* (2013.01); *G06F 2221/2141* (2013.01)

(58) Field of Classification Search
None
See application file for complete search history.

(56) References Cited

U.S. PATENT DOCUMENTS

| 6,199,164 B1 * | 3/2001 | Nishimoto | H04L 63/083 709/200 |
| 10,075,451 B1 * | 9/2018 | Hall | G06F 21/6245 |
| 2002/0019828 A1 * | 2/2002 | Mortl | G06F 21/6218 |

(Continued)

*Primary Examiner* — Jason Chiang
(74) *Attorney, Agent, or Firm* — Brinks Gilson & Lione (57) ABSTRACT

A system for managing personal data stored by an enterprise includes an interface, a permissions database, a processor, and non-transitory computer readable media. The interface is configured to receive a request to access at least some of the personal data, the request defining a purpose for the request. The permissions database that stores a plurality of records that define permissions associated with the personal data. The non-transitory computer readable media in communication with the processor that stores instruction code which, when executed by the processor, causes the processor to locate, within one or more disparate source databases within the enterprise, personal data associated with one or more individuals. For each individual, the processor generates a record in the permissions database that relates the individual to: a) attributes of the personal data; b) legal grounds information that defines process rights; c) one or more purposes for which the personal data may be used; and d) constraint information that defines limitations on the individual to modify or delete the personal data. The processor selects one or more records associated with a purpose that matches the purpose of the request. The processor retrieves personal data associated with attributes of the one or more records from the one or more disparate source databases. The processor then communicates, via the interface, the retrieved personal data to a requestor associated with the request.

22 Claims, 9 Drawing Sheets

(56) References Cited

U.S. PATENT DOCUMENTS

| | | | | |
|---|---|---|---|---|
| 2002/0035556 | A1* | 3/2002 | Shah | G06Q 10/10 |
| 2003/0078894 | A1* | 4/2003 | Kon | G06F 21/31 |
| | | | | 705/64 |
| 2003/0097383 | A1* | 5/2003 | Smirnov | G06Q 10/10 |
| 2004/0260948 | A1* | 12/2004 | Miyata | G06F 21/604 |
| | | | | 726/28 |
| 2006/0085443 | A1* | 4/2006 | Pae | G06F 21/6227 |
| 2006/0224597 | A1* | 10/2006 | Fitzpatrick | G06F 21/6245 |
| 2006/0265252 | A1* | 11/2006 | Nishii | G06F 19/321 |
| | | | | 705/3 |
| 2010/0088743 | A1* | 4/2010 | Hayashida | G06F 21/41 |
| | | | | 726/1 |
| 2010/0185656 | A1* | 7/2010 | Pollard | G06F 21/6245 |
| | | | | 707/769 |
| 2010/0262668 | A1* | 10/2010 | Piett | H04W 76/50 |
| | | | | 709/206 |
| 2010/0281514 | A1* | 11/2010 | Noh | G06Q 30/02 |
| | | | | 726/1 |
| 2017/0140174 | A1* | 5/2017 | Lacey | G06F 21/6245 |
| 2019/0005210 | A1* | 1/2019 | Wiederspohn | G06F 21/31 |
| 2019/0156053 | A1* | 5/2019 | Vogel | G06F 21/6245 |

\* cited by examiner

Account Information — 600

Account number: 11223344 — 602
[Submit]

| Attribute | Value | New Value | Action |
|---|---|---|---|
| Name | John Doe | | ✗ ✓ |
| Address | 111 Main St. | | ✗ ✓ |
| Phone number 1 | 111 222 1212 | | ✗ ✓ |
| Birth date | 01/01/1985 | | ✗ ✓ |
| Income | $100,000 | | ✗ ✓ |
| Gender | Male | | ✗ |
| ... | ... | ... | ... |

Report — 610

Attribute(s) Name, Address cannot be deleted.
Attributes required by Contract1. Can be deleted after 02/05/2020.

Attribute(s) Birth date has been deleted.

Attribute(s) Income has been updated.

Access Information

ID: 1234566 (805a)
Password: abc123 (805b)
Purpose: Logistics ▽ (810)

Submit

Available Attribute(s) | Download
- Name
- Address
- Phone number 1
- Birth date
- Income
- Gender
... (815)
☐ ☐ ☐ ☐ ☐ ...

SYSTEM AND METHOD FOR MANAGING ENTERPRISE DATA

BACKGROUND

Field

This application generally relates to enterprise management systems. In particular, this application describes a system and method for managing enterprise data.

Description of Related Art

Companies typically utilize systems such as enterprise resources planning (ERP) systems, customer relationship management (CRM) systems, supply chain management (SCM) systems, etc. to integrate management functions of core business processes of the enterprise such as marketing processes, sales processes, logistics processes, etc. Each process may rely on personal data stored within one or more subsystems of the system that are associated with any number of individuals.

Regulations in a growing number of jurisdictions are requiring that personal data residing with these enterprises conform to certain standards. For example, the soon-to-be-enacted General Data Protection Regulation (GDPR) in the European Union requires that enterprises provide a mechanism for allowing users to have their personal data/information removed from systems of the enterprise. The GDPR also requires companies that hold personal data of EU citizens to understand if and what personal data is involved when a data subject exercises other rights such as the right to access the data, the right to rectify the data, etc. Other rights provided by the GDPR are required to be managed by companies.

Unfortunately, ensuring that the personal data is removed is a cumbersome process which may ultimately fail. For example, instructions may have to be sent to various IT groups managing disparate systems within the enterprise to have the information removed. In some cases, the information may be inadvertently left on a system. Worse yet, back-end processes of the enterprise that replicate data across systems may copy the personal data back to a system where the personal data was recently removed.

BRIEF SUMMARY

In one aspect, a system for managing personal data stored by an enterprise includes an interface, a permissions database, a processor, and non-transitory computer readable media. The interface is configured to receive a request to access at least some of the personal data. The request defines a purpose for the request. The permissions database stores a plurality of records that define permissions associated with the personal data. The non-transitory computer readable media is in communication with the processor and stores instruction code which, when executed by the processor, causes the processor to locate, within one or more disparate source databases within the enterprise, personal data associated with one or more individuals. For each individual, the processor generates a record in the permissions database that relates the individual to: a) attributes of the personal data; b) legal grounds information that defines process rights; c) one or more purposes for which the personal data may be used; and d) constraint information that defines limitations on the individual to modify or delete the personal data. The processor selects one or more records associated with a purpose that matches the purpose of the request. The processor retrieves personal data associated with attributes of the one or more records from the one or more disparate source databases. The processor then communicates, via the interface, the retrieved personal data to a requestor associated with the request.

In a second aspect, a method for managing personal data stored by an enterprise includes receiving a request to access at least some of the personal data. The request defines a purpose for the request. The method further includes locating, within one or more disparate source databases within the enterprise, personal data associated with one or more individuals. For each individual, a record is generated in the permissions database that relates the individual to: a) attributes of the personal data; b) legal grounds information that defines process rights; c) one or more purposes for which the personal data may be used; and d) constraint information that defines limitations on the individual to modify or delete the personal data. One or more records associated with a purpose that matches the purpose of the request are selected. Personal data associated with attributes of the one or more records are retrieved from the one or more disparate source databases. The retrieved personal data is communicated, via an interface, to a requestor associated with the request.

In a third aspect, a non-transitory computer readable medium includes instruction code for managing personal data stored by an enterprise. The instruction code is executable by a machine and causes the machine to perform acts including receiving a request to access at least some of the personal data. The request defines a purpose for the request. The machine also locates, within one or more disparate source databases within the enterprise, personal data associated with one or more individuals. For each individual, the machine generates a record in the permissions database that relates the individual to: a) attributes of the personal data; b) legal grounds information that defines process rights; c) one or more purposes for which the personal data may be used; and d) constraint information that defines limitations on the individual to modify or delete the personal data. The machine selects one or more records associated with a purpose that matches the purpose of the request. The machine retrieves personal data associated with attributes of the one or more records from the one or more disparate source databases. Then the machine communicates, via an interface, the retrieved personal data to a requestor associated with the request.

DETAILED DESCRIPTION

The embodiments described below overcome the problems described in the background by providing an enterprise system that is adapted to comply with regulatory requirements concerning personal data in an efficient manner. In general, the enterprise system maintains a database that consolidates information that relates attributes of information stored within the enterprise system to potential rights to personal data associated with the attributes that may be conferred upon individuals associated with the personal data. The database also relates the attributes to various legal constraints on those rights. The database further relates the attributes to various purposes for which corresponding personal data may be used by others, such as data scientist.

Requests to exercise rights (e.g., rights conferred by GDPR) as they relate to personal data are granted or denied based on information in the database. Basing the decision upon information in the database reduces the number of network transactions that would otherwise be required in requesting the information directly from numerous disparate systems located throughout the enterprise. As a result, the system uses less power and computational resources than disparate systems because redundant operations present in those disparate systems are eliminated.

Figure 1:
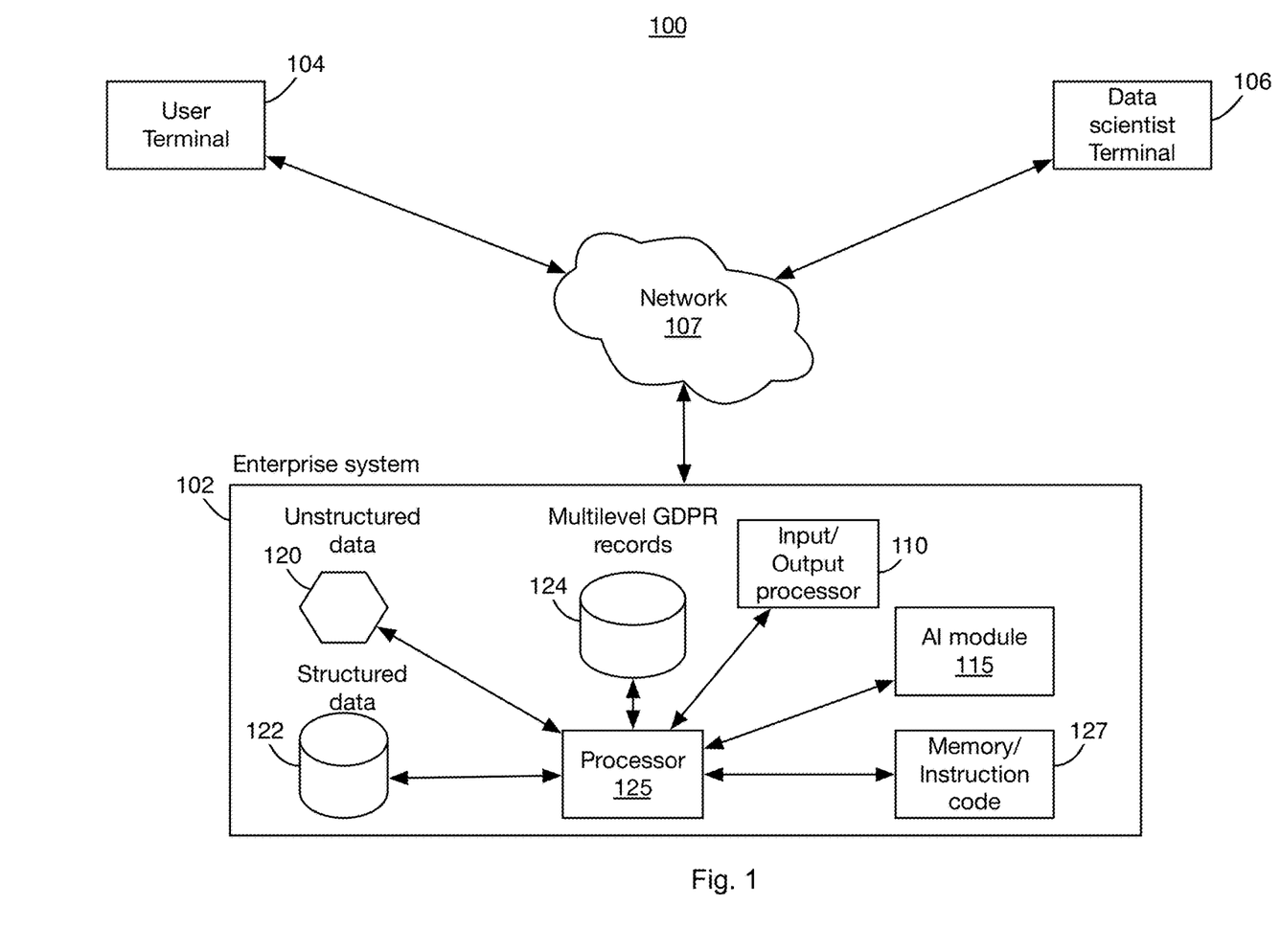
FIG. 1 illustrates an exemplary environment that includes various systems/devices that facilitate managing enterprise data.

FIG. 1 illustrates an exemplary environment 100 that includes various systems/devices that facilitate managing enterprise data. Exemplary systems/devices of the environment 100 include an enterprise system 102, a user terminal 104, and a data scientist terminal 106. The enterprise system 102, user terminal 104, and data scientist terminal 106 may communicate with one another via a network 107, such as the Internet.

The user terminal 104 and data scientist terminal 106 may correspond to computer systems such as an Intel®, AMD®, or PowerPC® based computer system or a different computer system and can include application specific computer systems. The computer systems may include an operating system, such as Microsoft Windows®, Linux, Unix® or other operating system. The terminals may be desktop PCs and/or mobile terminals.

The user terminal 104 may be operated by a user/individual who is associated with personal data stored within the enterprise system 102. The user terminal 104 may facilitate access to the personal data, editing of the personal data, and/or specifying legal grounds information for controlling access to the personal data by others. In this regard, the user terminal 104 may be configured to facilitate communicating information with the enterprise system 102 via one or more APIs of the enterprise system 102. For example, the user terminal 104 may be configured to communicate with the enterprise system 102 via an API such as a webserver API, a SOAP-based web service, a RESTful API, and/or a different type of API.

Likewise, the data scientist terminal 106 may be operated by a data scientist interested in performing an analysis based on personal data stored within enterprise system 102. In this regard, the data scientist terminal 106 may be configured to facilitate communicating information with the enterprise system 102 via one or more APIs of the enterprise system 102. For example, the data scientist terminal 106 may be configured to communicate with the enterprise system 102 via an API such as a webserver API, a SOAP-based web service, a RESTful API, and/or a different type of API.

The enterprise system 102 integrates management functions of core business processes of an enterprise such as marketing processes, sales processes, logistics processes, etc. Each process may rely on personal data stored within one or more subsystems of the enterprise system 102 that is associated with any number of individuals. In this regard, the enterprise system 102 may implement specific logic that facilitates ensuring that any personal data stored within the enterprise system 102 is in compliance with governmental regulations such as the aforementioned General Data Protection Regulation (GDPR). For example, the logic controls access to the personal data by others. The logic allows individuals to have their private information removed from the enterprise system 102. The logic assesses the impact on any breaches of personal data. The logic may perform other operations.

To facilitate performing these operations, the enterprise system 102 may include a processor 125, input/output subsystem 110, and an AI subsystem 115. The enterprise system 102 may include other subsystems.

The enterprise system 102 may store information that includes personal data to facilitate performing the various processes noted above (i.e., marketing, sales, logistics, etc.). In this regard, the personal data may be stored as structured data 120 (e.g., records in a database), unstructured data 122 (e.g., documents, emails, etc.), or differently. The enterprise system 102 may also include a permissions/multilevel record database (MRD) 124 to help facilitate implementation of the logic for ensuring the compliance with the governmental requirements noted above.

The I/O processor 110 of the enterprise system 102 is configured to facilitate communications with entities outside of the enterprise system 102. In this regard, the I/O processor 110 may be configured to dynamically determine the communication methodology utilized by entities of the environment 100 for communicating information to the entities using the determined communication methodology. For example, the I/O processor 110 may determine that a first entity utilizes a RESTful API and may, therefore, communicate with the entity using a RESTful communication methodology.

As described in more detail below, the I/O processor 110 may implement a web browser to facilitate generating one or more web-based interfaces through which users, data scientist, and others may interact with the enterprise system 102. The web browser may implement a web services interface to facilitate automating some of the web-based functionality via a computer. For example, one or more of the entities of the environment 100 may utilize the web services interfaces to access information stored by the enterprise system 102.

The AI subsystem 115 is configured to locate personal data stored within unstructured data stored within the enterprise system 102. In this regard, the AI subsystem 115 may utilize various natural language processing techniques to locate personal data. For example, the language processing may perform a Knuth-Morris-Pratt string searching algorithm to locate and extract occurrences of a certain words within a document. Linear clustering algorithms may be utilized to mine text data. Other natural language and/or machine learning techniques may be utilized to locate personal data.

The processor 125 executes instruction code stored in a memory device 127 for coordinating activities performed between the various subsystems. The processor 125 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

It is contemplated that the I/O processor 110, AI subsystem 115, and any other subsystem referenced herein may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, etc.

Figure 2:
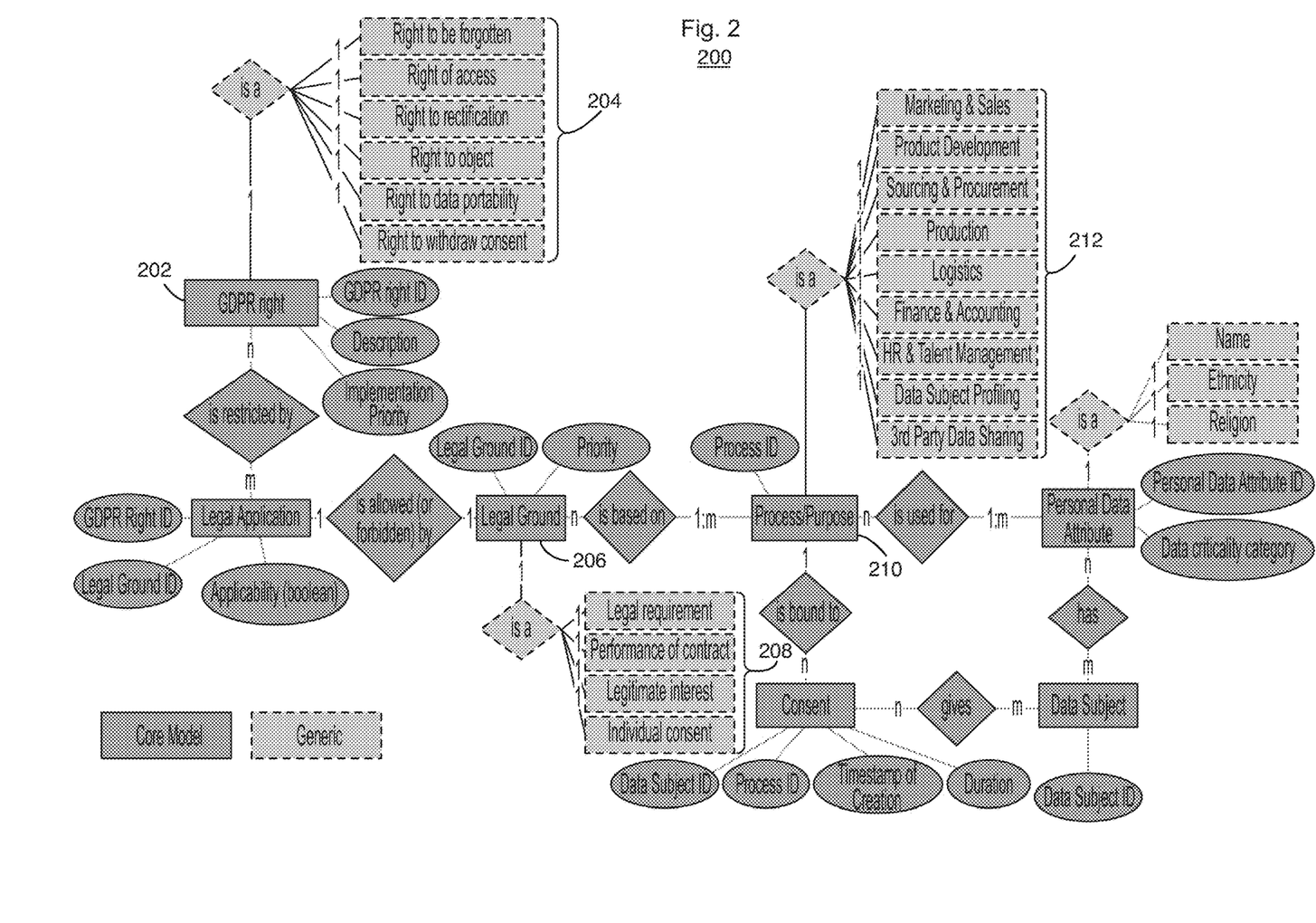
FIG. 2 illustrates a metadata model that represents information stored in a permissions database of enterprise system of the environment.

As noted above, the MRD 124 stores records that facilitate implementation of the governmental compliance logic. FIG. 2 illustrates an exemplary graph 200 of a metadata model that defines relevant logical relationships between entities stored within the MRD 124. The graph 200 defines core nodes and generic nodes (illustrated with dashed lines). The selection and arrangement of the nodes is chosen to facilitate implementation of logic for complying with the aforementioned General Data Protection Regulation (GDPR).

Referring to the graph 200, the core nodes and the relationships there between represent core entities/classes in the MRD 124 that are understood to be required/implemented by any organization in compliance with the GDPR. The generic nodes and the relationships there between represent custom entities/instances in the MRD 124 that are understood to be specific to a given enterprise. For example, all enterprises in compliance with the GDPR are understood to implement entities of the class GDPR right 202, which is intended to represent rights conferred upon an individual for which personal data is stored within the enterprise. Specific GDPR rights instances 204 in the exemplary graph 200 are, for example, the right to be forgotten, right to access, right to rectification, right to object, right to data portability, and right to withdraw consent. The specific instances may be different for different enterprises. However, all enterprises would be understood to confer some type of GDPR right.

The GDPR may allow for the dissemination of personal data for specific purposes to facilitate performing analysis on the personal data. Such purposes are considered to be instances of the Process/Purpose class 210. According to the graph 200, specific Process/Purpose instances 212 for which the personal data may be utilized include marketing and, sales analysis, product development analysis, etc.

Figure 3:
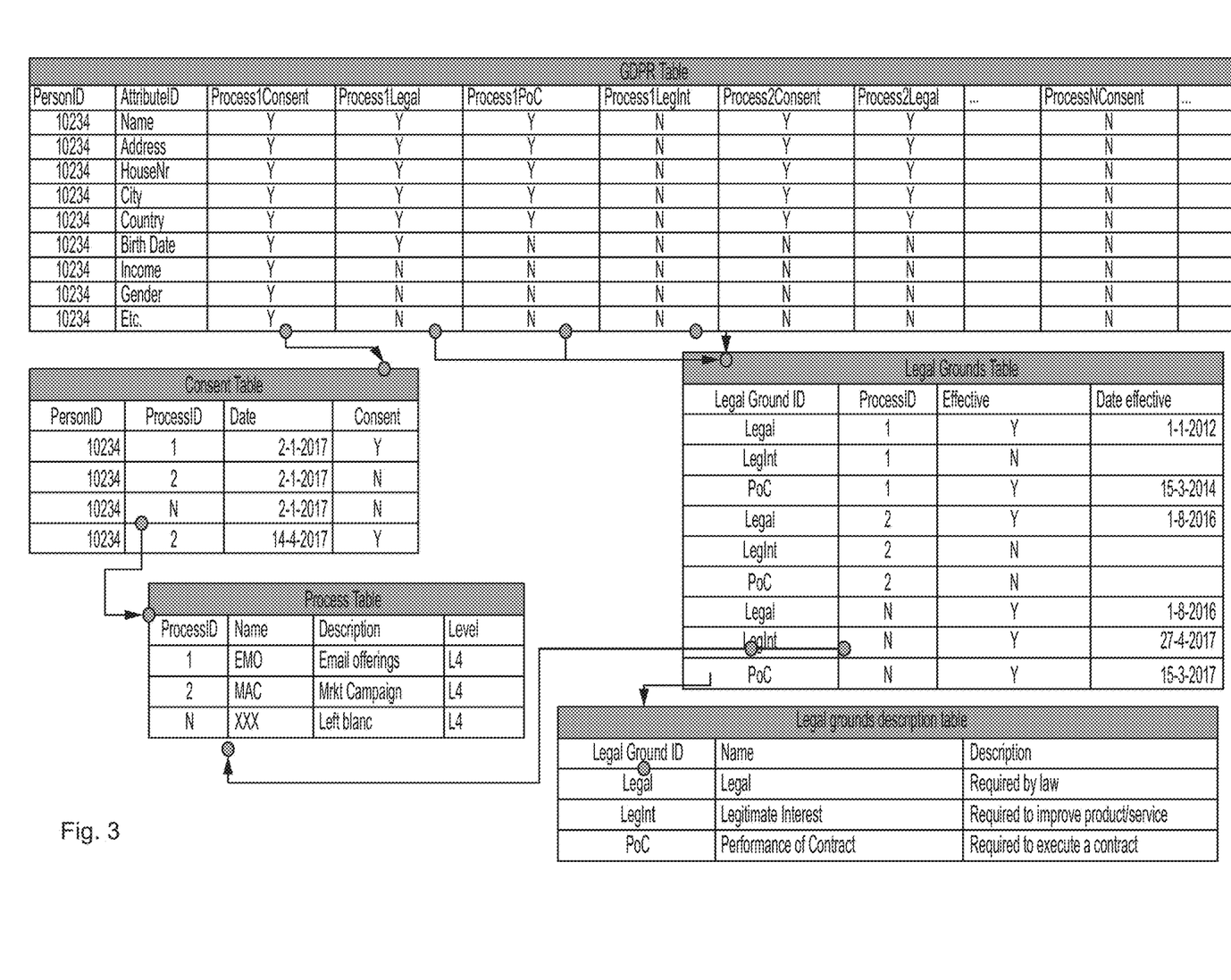
FIG. 3 illustrates exemplary tables of records that may be stored in the permissions database.

FIG. 3 illustrates exemplary tables of records that may be stored in the MRD 124 in implementing the exemplary graph 200 of FIG. 2. The tables include a GDPR table, consent table, legal grounds table, and process table.

Each record in the GDPR table relates the individual associated with a person ID with an attribute (e.g., name, address, etc.), and values for each legal ground as applied to each process. The value for each legal ground and process indicates whether an individual is able to exercise one of his rights to the personal data as defined in the graph 200. The legal grounds correspond to the specific constraint instances 208 illustrated in the graph 200. The processes correspond to the specific process/purpose instances 212 illustrated in the graph 200.

For example, the first record in the GDPR table relates the individual associated with person ID 10234 with the attribute Name. For each process (i.e., process 1-N) a value is provided for each legal ground. For example, values for the legal grounds individual consent, legal requirement, performance of contract, and legitimate interest are provided.

According to the first record, the individual has provided consent for his name to be used for process 1 which, according to the process table, corresponds to email offerings. The record also indicates that the enterprise has a legal requirement for being able to utilize the individual's name for process 1 and that the individual is contractually obligated to allow the enterprise to utilize the individual's name for process 1. However, outside of these reasons, the enterprise does not have a legitimate interest for needing to use the individual's name for process 1.

The sixth record indicates that the individual has provided consent for his birth date to be used for process 1. The record also indicates that the enterprise has a legal requirement for being able to utilize the individual's birth date for process 1. However, the individual is not contractually obligated to allow the enterprise to utilize his birth date for process 1, and the enterprise does not have a legitimate interest for needing to use the individual's birth date for process 1.

The consent table provides a concise way of determining the processes for which the individual associated with a given person ID (e.g., 10234) has provided a consent value. Each record in the consent table relates the person ID to a process ID, a consent value (i.e., yes or no) and a date at which the consent value was provided. For example, according to record 1, on Feb. 1, 2017, the person associated with person ID 10234 gave consent to use some or all of his personal data for process 1 (i.e., email offerings). According to record 2, on the same date, the person associated with person ID 10234 declined to give consent to use some or all of his personal data for process 2 (i.e., marketing campaign).

The legal grounds table provides a concise way of determining the value for each legal ground and process. Each record in the legal grounds table relates a legal ground (e.g., legal requirement, legitimate interest) with a process ID, a value indicative of whether the legal ground is effective, and a date the legal ground became effective.

Figure 4:
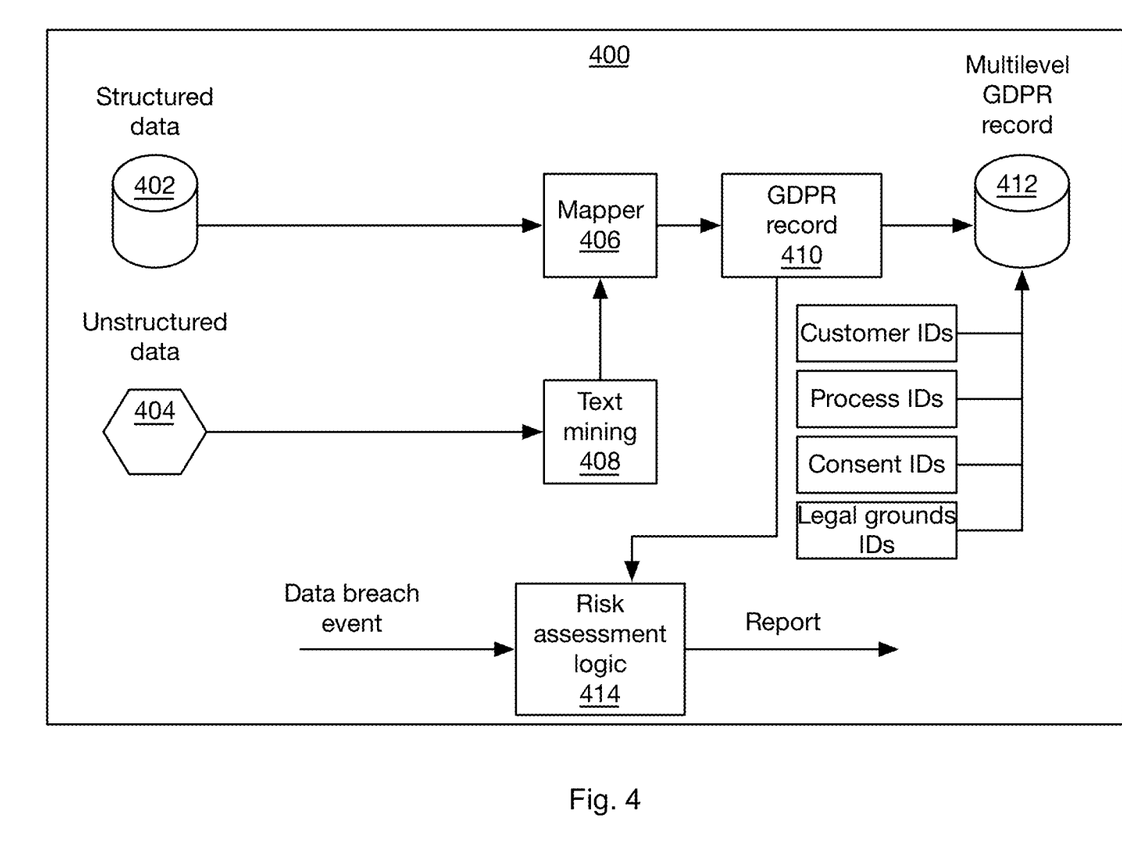
FIG. 4 illustrates information flow between various entities of the enterprise system in populating the permissions database with records.

FIG. 4 illustrates the flow of information between various entities of the enterprise system in populating the MRD 124 with the records described above. The entities include various data repositories that include structured data 402 and unstructured data 404, mapper logic 406, text mining logic 408, a GDPR record 410, and risk assessment logic 414. The mapper logic 406, text mining logic, and risk assessment logic 414 may be implemented via instruction code stored in non-transitory computer readable media 127 that resides within the subsystems of the enterprise system 102 configured to cause the respective subsystems to perform the functions described below for each entity.

The structured data 402 corresponds to personal data stored in an organized manner such as in a relational database. The structured data 402 may physically reside in any number of storage repositories/devices located throughout the enterprise system 102. The unstructured data 404 corresponds to documents, emails, etc., that may be stored within various disparate system located throughout the enterprise system 102.

The text mining logic 408 is configured to locate personal data stored within unstructured data 404 stored within the enterprise system 102 and to output corresponding structured personal data, such as JSON formatted data, XML formatted data, etc., that facilitates efficient retrieval of different attributes of the personal data. In this regard, the text mining logic 408 may be implement entirely or at least in part by the AI subsystem 115.

The text mining logic 408 may utilize various natural language processing techniques to locate personal data. For example, the language processing may perform a Knuth-Morris-Pratt string searching algorithm to locate and extract occurrences of a certain words within a document. Linear clustering algorithms may be utilized to mine text data. Other natural language and or machine learning techniques may be utilized to located personal data.

The mapper 406 is configured to identify different attributes of personal data maintained in the structured data and unstructured data (via the text mining logic 408) from the various data repositories located throughout the enterprise system 102 and to relate the identified attributes to predefined attributes in a GDPR record 410, which will be entered into the MRD 124. For example, different attributes may have been used in the structured data repositories to define an individual's name (e.g., Full name, Person's name, etc.). In this case, the mapper 406 may relate the different attributes to a common attribute such as Name. Likewise, different attributes for denoting addresses, birth dates, genders, salaries, etc., may be related to unified attributes.

The mapper 406 may also maintain links to locations within the various data repositories where personal data associated with the attributes is stored. For example a listing of URLs to the various data repositories may be maintained. The links facilitate communicating instructions to the various data repositories to, for example, delete personal data, update personal data, and/or provide other access to the personal data.

The GDPR record 410 is inserted into the MRD 124 along with customer ID records, process ID records, consent ID records, and legal ground ID records to populate the various tables illustrated in FIG. 3.

The risk assessment logic 414 is configured to generate a report to assess the risk of a personal data breach based on a list of attributes that have been breached. For example, the risk assessment logic 414 may determine a severity of the breach by calculating a report on the criticality of the breached data and the number of processes in which this data is used within the company. The personal data that has been breached is assessed through multiple risk models. Different models focus on different aspects like: data, process, reputational risk. The scores of individual risk models are then combined to get an overall risk score. The overall risk score determines the risk involved and the actions that should be taken. In this way consequences of the data breach become tangible. The report can be used to inform a supervising authority without undue delay and to provide a list of all individuals that have been affected so that they may be contacted and informed regarding the breach.

Figure 5:
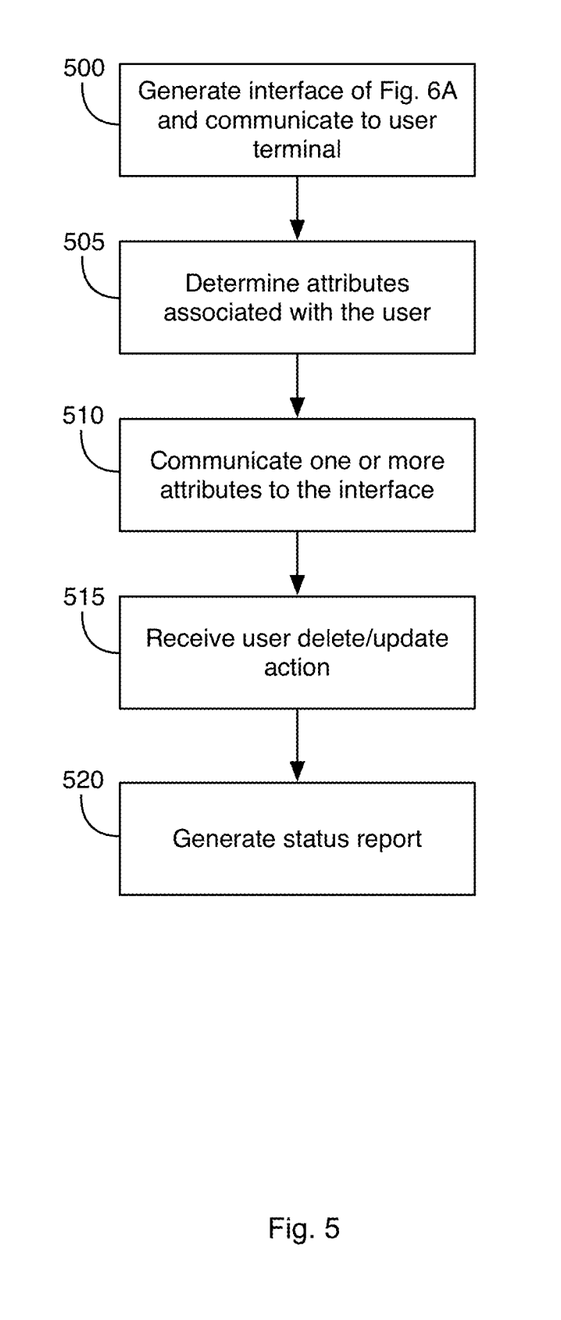
FIG. 5 illustrates exemplary operations for allowing a user to access his personal data.

Exemplary operations performed by the enterprise system 102 in allowing an individual to access his personal data, which is stored within the enterprise system 102, are illustrated in FIG. 5. In this regard, the operations may be implemented via instruction code stored in non-transitory computer readable media 127 that resides within the subsystems configured to cause the respective subsystems to perform the operations illustrated in the figures and discussed herein. The operations are best understood with reference to the exemplary interfaces illustrated in FIGS. 6A and 6B.

At block 500, the IO processor 110 may generate an interface 600 (FIG. 6A) and communicate the interface to the user terminal 104. The interface 600 may include one or more identification fields 205 to facilitate authenticating the user of the user terminal 104.

At block 505, the enterprise system 102 may determine attributes associated with the user. For example, the enterprise system 102 may determine an ID (i.e., Person ID) associated with the user. The enterprise system 102 may then search the MRD 124 for any GDPR records related to the ID.

Figure 6A:
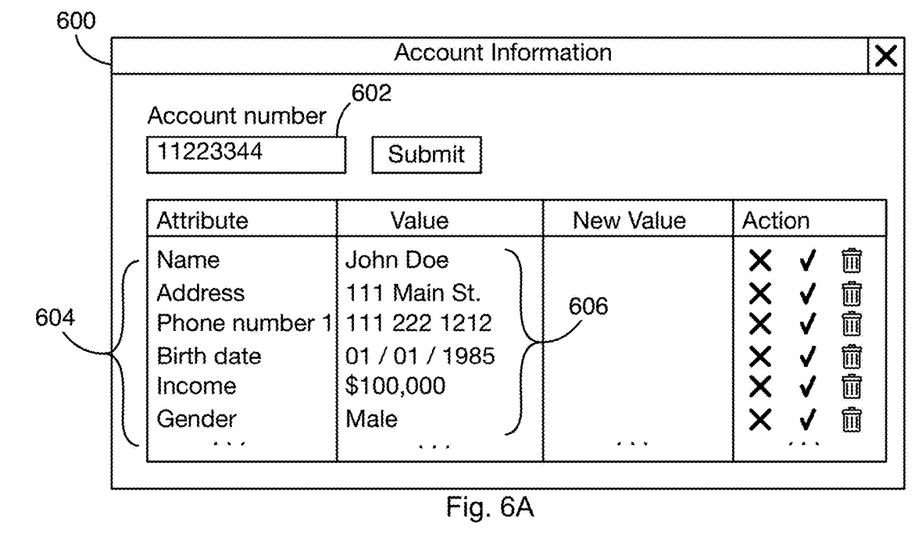
FIGS. 6A and 6B illustrate exemplary interfaces that may be generated to facilitate access by the user.

At block 510, the enterprise system 102 may communicate one or more of the determined attributes 604 to the interface 600. For each attribute 604, the interface may provide controls that facilitate performing actions on data associated with the attribute. For example, a trash button may be provided if the user is permitted to delete personal data associated with the attribute. In some cases, actual values 606 associated with attributes 604 may be provided in the interface 600. In some cases, the user may be permitted to provide updated values for the attributes.

In some cases, legal grounds for why a particular attribute may not be deleted and/or updated may be specified in the MRD 124. For example, the MRD 124 may indicate that the attribute is required as part of a contractual obligation, legal requirement, and/or other reason. In these cases, the attribute may not be shown on the interface. Alternatively, the attribute may be shown, but the user may not be provided with controls for triggering deletion and/or updating of the information.

At block 515, if the user selects a control for the attribute, a corresponding instruction may be communicated to the enterprise system 102 to, for example, delete and/or update personal data associated with the correspond attribute. In this case, the mapper 406 may communicate instructions to the various data repositories that store values for the corresponding attribute to delete and/or update the corresponding personal data.

Figure 6B:
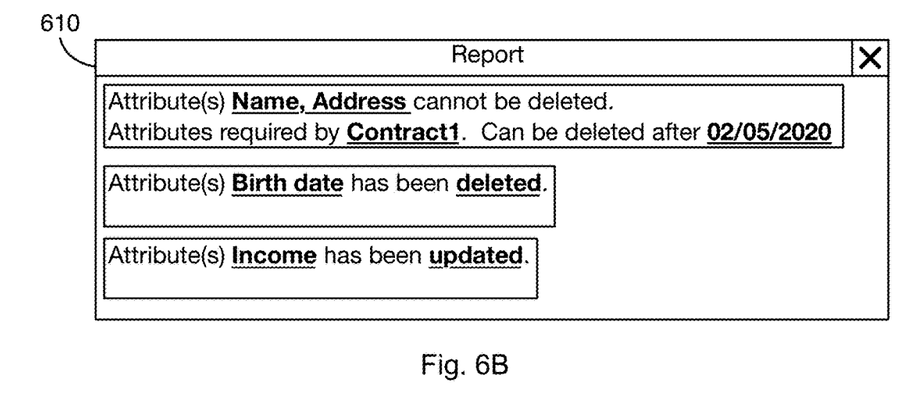

At block 520, a report interface 610 may be communicated to the user to indicate the status of the requested changes. For example, the report interface 610 may indicate that certain attributes could not be deleted and may provide reasons why the attributes could not be deleted. In some cases, the report may indicate a date after which the attribute may be deleted. For example, the date may correspond to the date at which a particular contractual obligation terminates. The reasons provided and the date may be based on the information in the legal grounds table of FIG. 3.

Figure 7:
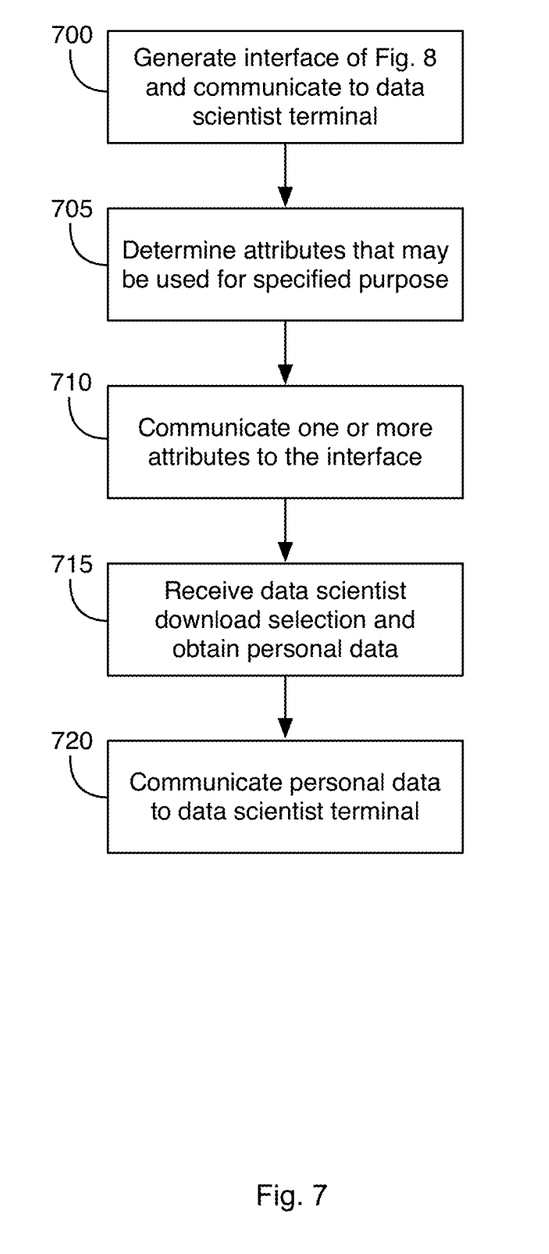
FIG. 7 illustrates exemplary operations for allowing a data scientist to access personal data stored within the enterprise for analytical purposes.
Figure 8:
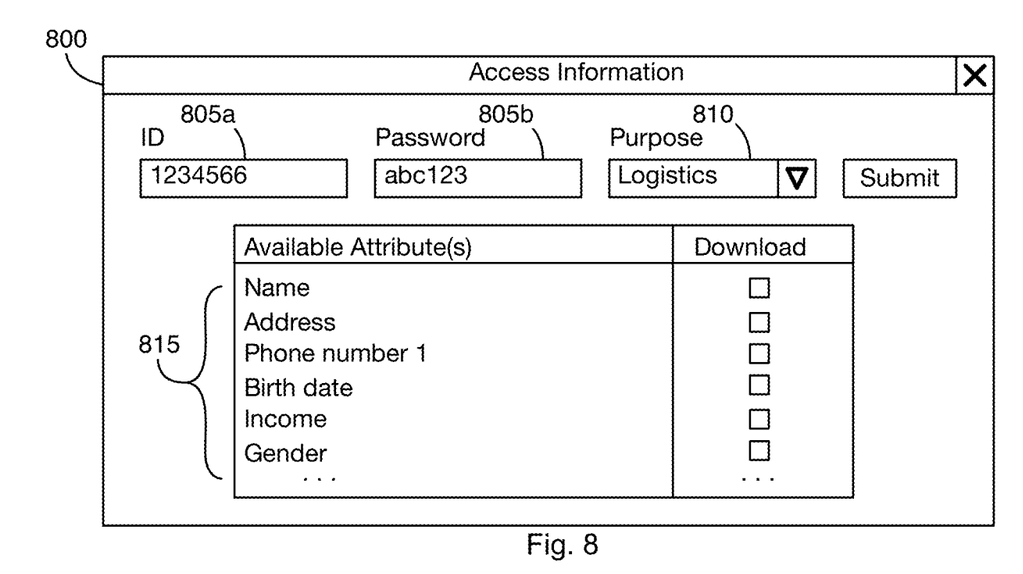
FIG. 8 illustrates an exemplary interface that may be generated to facilitate access by the data scientist.

Exemplary operations performed by the enterprise system 102 in allowing a data scientist to access personal data stored within the enterprise system 102 are illustrated in FIG. 7 In this regard, the operations may be implemented via instruction code stored in non-transitory computer readable media 127 that resides within the subsystems configured to cause the respective subsystems to perform the operations illustrated in the figures and discussed herein. The operations are best understood with reference to the exemplary interfaces illustrated in FIG. 8.

At block 700, the 10 processor 110 may generate an interface 800 (FIG. 8) and communicate the interface to the data scientist terminal 106. The interface 800 may include one or more identification fields 805a, 805b to facilitate authenticating the data scientist. The interface 800 may also include a field 810 for specifying the purpose for requiring the information. For example, a drop down box populated with potential purposes may be provided. The potential purposes may correspond to those specified in the process table illustrated in FIG. 3.

At block 705, if the data scientist is successfully authenticated, the enterprise system 102 may determine attributes associated with one or more individuals that may be used for the specified purpose. For example, if the specified purpose relates to Email Offerings (identified as process ID 1 in the process table), the enterprise system 102 may search under the Process 1 Consent, Legal, PoC, and LegInt fields in the GDPR table and select any attributes for which at least one of these fields has a value of Y.

At block 710, the enterprise system 102 may communicate one or more of the determined attributes 815 to the interface via the IP processor 110. For each attribute, the interface may provide a control to facilitate downloading personal data associated with the attribute.

At block 715, if the data scientist selects certain attributes for downloading, a corresponding instruction may be communicated to the enterprise system 102 for downloading personal data associated with the attributes. In this case, the enterprise system 102 may determine the person ID associated with each attribute for which personal data may be downloaded. For example, personal data may exist for a large number of individuals, but only some of those individual may have provided consent for their personal data to be utilized for the purpose specified by the data scientist In this case, the mapper 406 may communicate instructions to the various data repositories 402 and 404 that store values for the corresponding attribute to retrieve the corresponding personal data for individuals for which the personal data may be used. For example, some, but not all, individuals may have allowed their income to be used for the specified purpose. Therefore, the mapper 406 may request the income for those individuals that allowed their income to be used and not the income of the other individuals.

At block 720, the requested personal data may be downloaded at the data scientist terminal.

Figure 9:
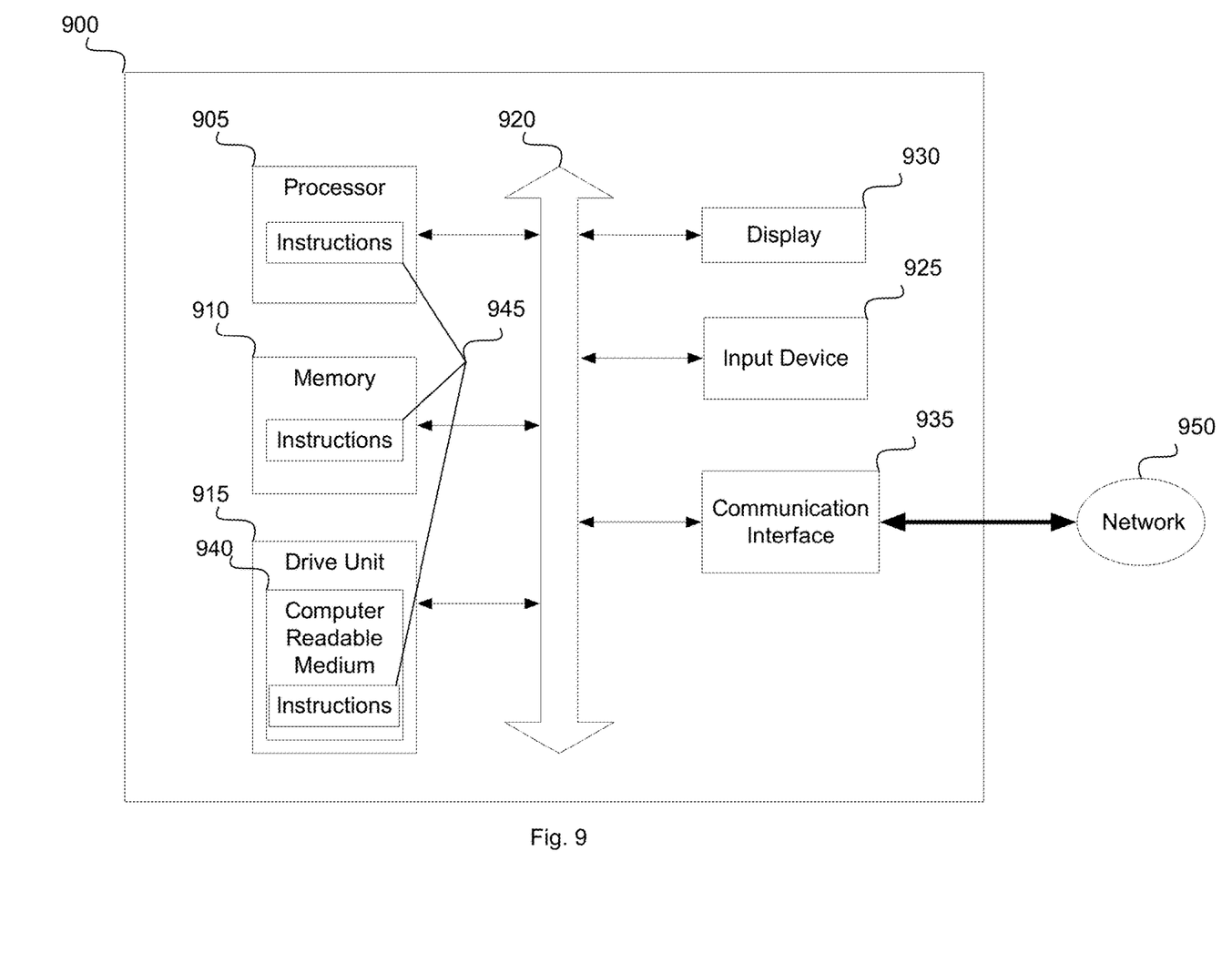
FIG. 9 illustrates an exemplary computer system that may form part of or implement the systems described in the figures or in the following paragraphs.

FIG. 9 illustrates a computer system 900 that may form part of or implement the systems, environments, devices, etc., described above. The computer system 900 may include a set of instructions 945 that the processor 905 may execute to cause the computer system 900 to perform any of the operations described above. The computer system 900 may operate as a stand-alone device or may be connected, e.g., using a network, to other computer systems or peripheral devices.

In a networked deployment, the computer system 900 may operate in the capacity of a server or as a client computer in a server-client network environment, or as a peer computer system in a peer-to-peer (or distributed) environment. The computer system 900 may also be implemented as or incorporated into various devices, such as a personal computer or a mobile device, capable of executing instructions 945 (sequential or otherwise) causing a device to perform one or more actions. Further, each of the systems described may include a collection of subsystems that individually or jointly execute a set, or multiple sets, of instructions to perform one or more computer operations.

The computer system 900 may include one or more memory devices 910 communicatively coupled to a bus 920 for communicating information. In addition, code operable to cause the computer system to perform operations described above may be stored in the memory 910. The memory 910 may be a random-access memory, read-only memory, programmable memory, hard disk drive or any other type of memory or storage device.

The computer system 900 may include a display 930, such as a liquid crystal display (LCD), a cathode ray tube (CRT), or any other display suitable for conveying information. The display 930 may act as an interface for the user to see processing results produced by processor 905.

Additionally, the computer system 900 may include an input device 925, such as a keyboard or mouse or touchscreen, configured to allow a user to interact with components of system 900.

The computer system 900 may also include a disk or optical drive unit 915. The drive unit 915 may include a computer-readable medium 940 in which the instructions 945 may be stored. The instructions 945 may reside completely, or at least partially, within the memory 910 and/or within the processor 905 during execution by the computer system 900. The memory 910 and the processor 905 also may include computer-readable media as discussed above.

The computer system 900 may include a communication interface 935 to support communications via a network 950. The network 950 may include wired networks, wireless networks, or combinations thereof. The communication interface 935 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A system for managing personal data stored by an enterprise, the system comprising:
   an interface configured to receive a request invoking a right to access at least some of the personal data of an individual, the personal data of the individual stored within the enterprise;
   a permissions database that stores a plurality of records that define permissions associated with personal data;
   a processor; and
   non-transitory computer readable media in communication with the processor that stores instruction code which, when executed by the processor, causes the processor to:
   locate, within one or more disparate source databases within the enterprise, the personal data of the individual;

locate, with an artificial intelligence subsystem using natural language processing, additional personal data stored within unstructured data stored within the enterprise, the unstructured data comprising at least one of documents and email;

output structured data corresponding to the unstructured data;

for the individual, generate one or more records in the permissions database that relates the individual to:
  a) attributes of the personal data of the individual;
  b) legal grounds information that defines process rights comprising use of the personal data of the individual by the enterprise;
  c) one or more purposes for which the personal data may be used by the enterprise; and
  d) constraint information that defines limitations on the individual to modify or delete the personal data of the individual stored within the enterprise;

select one or more records responsive to the request invoking the right;

retrieve, from the one or more disparate source databases, the personal data of the individual, the retrieved personal data associated with attributes of the selected one or more records;

communicate, via the interface, the retrieved personal data to a requestor associated with the request;

receive, via the interface, from the requestor, a requested change to the retrieved personal data associated with the attributes; and communicate, via the interface, the status of the requested change to the requestor.

2. The system according to claim 1, wherein the interface is further configured to receive as the requested change a request to delete personal data associated with one or more attributes associated with the individual and stored within the enterprise, wherein in response, the instruction code causes the processor to:

select, from the permissions database, one or more records that are: a) associated with the individual and the one or more attributes; and b) which have constraint information that permits the individual to delete personal data associated with the one or more attributes; and for each record, communicate a request to a corresponding one or more disparate source databases to delete personal data associated with the one or more attributes.

3. The system according to claim 2, wherein the instruction code causes the processor to:

select, from the permissions database, one or more records that are: a) associated with the individual and the one or more attributes; and b) which have constraint information that prevents the individual from deleting personal data associated with the one or more attributes; and for each record, communicate, via the interface, as the status of the requested change, one or more reasons why personal data associated with the one or more attributes cannot be deleted.

4. The system according to claim 3, wherein the constraint information defines the reason why personal data associated with the one or more attributes cannot be deleted.

5. The system according to claim 1, wherein the interface is further configured to receive, as the requested change, a request to edit personal data associated with the individual and stored within the enterprise, wherein in response, the instruction code causes the processor to:

select, from the permissions database, one or more records that are associated with the individual, and which have constraint information that permits editing of the personal data of the individual associated with an attribute that is associated with the record to thereby determine editable attributes associated with the individual;

communicate, to the interface, personal data associated with the editable attributes;

receive from the interface, edited personal data associated with the editable attributes; and communicate the edited personal data to corresponding one or more disparate source databases to update the editable attributes.

6. The system according to claim 5, wherein subsequent to communicating the listing of the editable attributes, the instruction code causes the processor to:

receive legal grounds information associated with one or more editable attributes;

update one or more records in the permissions database associated with the one or more editable attributes and the individual with the legal grounds information.

7. The system according to claim 6, wherein the legal grounds information specifies a purpose for which consent to access personal data associated with a record is granted.

8. The system according to claim 1, wherein the requestor is the individual.

9. The system according to claim 1, wherein the non-transitory computer readable media in communication with the processor that stores instruction code further comprises instruction code which, when executed by the processor, causes the processor to:

retrieve the personal data associated with the attributes of the selected one or more records from the one or more disparate source databases according to the request invoking the right, the legal grounds information, and the constraint information in the selected one or more records.

10. A method for managing personal data stored by an enterprise, the method comprising:

receiving a request invoking a right to access at least some of the personal data of an individual, the personal data of the individual stored within the enterprise;

locating, within one or more disparate source databases within the enterprise, the personal data of the individual;

locating, with an artificial intelligence subsystem using natural language processing, additional personal data stored within unstructured data stored within the enterprise, the unstructured data comprising at least one of documents and email;

outputting structured data corresponding to the unstructured data;

generating one or more records in the permissions database that relates the individual to:
  a) attributes of the personal data of the individual;
  b) legal grounds information that defines process rights comprising use of the personal data of the individual by the enterprise;
  c) one or more purposes for which the personal data may be used by the enterprise; and
  d) constraint information that defines limitations on the individual to modify or delete the personal data of the individual stored within the enterprise;

selecting one or more records responsive to the request invoking the right;

retrieving, from the one or more disparate source databases, personal data of the individual, the retrieved personal data associated with attributes of the selected one or more records;

communicating, via an interface, the retrieved personal data to a requestor associated with the request;

receiving, via the interface, from the requestor, a requested change to the retrieved personal data associated with the attributes; and communicating, via the interface, the status of the requested change to the requestor.

11. The method according to claim 10, further comprising:

receiving, as the requested change, a request to delete personal data associated with one or more attributes associated with the individual, and stored within the enterprise;

in response, selecting, from the permissions database, one or more records that are: a) associated with the individual and the one or more attributes; and b) which have constraint information that permits the individual to delete personal data associated with the one or more attributes; and for each record, communicating a request to a corresponding one or more disparate source databases to delete personal data associated with the one or more attributes.

12. The method according to claim 11, further comprising:

selecting, from the permissions database, one or more records that are: a) associated with the individual and the one or more attributes; and b) which have constraint information that prevents the individual from deleting personal data associated with the one or more attributes; and for each record, communicating, via the interface and to the individual, as the status of the requested change, one or more reasons why personal data associated with the one or more attributes cannot be deleted.

13. The method according to claim 12, wherein the constraint information defines the reason why personal data associated with the one or more attributes cannot be deleted.

14. The method according to claim 10, further comprising:

receiving, as the requested change, a request to edit personal data associated with the individual;

in response, selecting, from the permissions database, one or more records that are associated with the individual, and which have constraint information that permits editing of the personal data of the individual associated with an attribute that is associated with the record to thereby determine editable attributes associated with the individual;

communicating, to the interface, personal data associated with the editable attributes;

receiving from the interface, edited personal data associated with the editable attributes; and communicating the edited personal data to corresponding one or more disparate source databases to update the editable attributes.

15. The method according to claim 14, wherein subsequent to communicating the listing of the editable attributes, the method further comprises:

receiving legal grounds information associated with one or more editable attributes;

updating one or more records in the permissions database associated with the one or more editable attributes and the individual with the legal grounds information.

16. The method according to claim 15, wherein the legal grounds information specifies a purpose for which consent to access personal data associated with a record is granted.

17. A non-transitory computer readable medium that includes instruction code for managing personal data stored by an enterprise, the instruction code being executable by a machine for causing the machine to perform acts, the instruction code comprising:

instructions to receive a request invoking a right to access at least some of the personal data of an individual, the personal data of the individual stored within the enterprise;

instructions to locate, within one or more disparate source databases within the enterprise, the personal data of the individual;

instructions to locate, with an artificial intelligence subsystem using natural language processing, additional personal data stored within unstructured data stored within the enterprise, the unstructured data comprising at least one of documents and email:

instructions to output structured data corresponding to the unstructured data;

instructions to generate one or more records in the permissions database that relates the individual to:

a) attributes of the personal data of the individual;

b) legal grounds information that defines process rights comprising use of the personal data of the individual by the enterprise;

c) one or more purposes for which the personal data may be used by the enterprise; and d) constraint information that defines limitations on the right of the individual to modify or delete the personal data;

instructions to select one or more records of the individual responsive to the request invoking the right;

instructions to retrieve personal data associated with attributes of the selected one or more records from the one or more disparate source databases;

instructions to communicate, via an interface, the retrieved personal data to a requestor associated with the request;

instructions to receive, via the interface, from the requestor, a requested change to the retrieved personal data associated with the attributes; and instructions to communicate, via the interface, the status of the requested change to the requestor.

18. The non-transitory computer readable medium according to claim 17, wherein the instruction code further comprises:

instructions to receive a request to delete personal data associated with one or more attributes associated with the individual and stored within the enterprise;

instructions to select, in response to the request, from the permissions database, one or more records that are: a) associated with the individual and the one or more attributes; and b) which have constraint information that permits the individual to delete personal data associated with the one or more attributes; and instructions to communicate, for each record, a request to a corresponding one or more disparate source databases to delete personal data associated with the one or more attributes.

19. The non-transitory computer readable medium according to claim 18, wherein the instruction code further comprises:
  instructions to select, from the permissions database, one or more records that are: a) associated with the individual and the one or more attributes; and b) which have constraint information that prevents the individual from deleting personal data associated with the one or more attributes; and
  instructions to communicate, for each record, via the interface and to the individual, one or more reasons why personal data associated with the one or more attributes cannot be deleted.

20. The non-transitory computer according to claim 19, wherein the constraint information defines the reason why personal data associated with the one or more attributes cannot be deleted.

21. The non-transitory computer according to claim 17, wherein the instruction code further comprises:
  instructions to receive a request to edit personal data associated with the individual, and stored within the enterprise;
  instructions to select, in response to the request, from the permissions database, one or more records that are: a) associated with the individual; and b) which have constraint information that permits editing of the personal data of the individual associated with an attribute that is associated with the record to thereby determine editable attributes associated with the individual;
  instructions to communicate, to the interface, personal data associated with the editable attributes;
  instructions to receive from the interface, edited personal data associated with the editable attributes; and
  instructions to communicate the edited personal data to corresponding one or more disparate source databases to update the editable attributes.

22. The non-transitory computer according to claim 21, wherein subsequent to communicating the listing of the editable attributes, the instruction code further comprising:
  instructions to receive legal grounds information associated with one or more editable attributes; and
  instructions to update one or more records in the permissions database associated with the one or more editable attributes and the individual with the legal grounds information.

* * * * *

UNITED STATES PATENT AND TRADEMARK OFFICE
CERTIFICATE OF CORRECTION

PATENT NO. : 10,824,758 B2  
APPLICATION NO. : 15/823165  
DATED : November 3, 2020  
INVENTOR(S) : Wolfgang Hankeln et al.

Page 1 of 1

It is certified that error appears in the above-identified patent and that said Letters Patent is hereby corrected as shown below:

In the Specification

In Column 8, Line 55, delete "10" and insert in its place --IO--.

In the Claims

In Column 14, Claim 17, Line 34, delete ":" at the end of the line and insert in its place --;--.

Signed and Sealed this  
Fifth Day of January, 2021

Andrei Iancu  
*Director of the United States Patent and Trademark Office*